US012417630B1

(12) United States Patent
Twist

(10) Patent No.: US 12,417,630 B1
(45) Date of Patent: Sep. 16, 2025

(54) CONNECTING COMPUTING DEVICES PRESENTING INFORMATION RELATING TO THE SAME OR SIMILAR TOPICS

(71) Applicant: Tengin Entertainment, Orinda, CA (US)

(72) Inventor: Thomas Twist, Orinda, CA (US)

(73) Assignee: Tengin Entertainment, Orinda, CA (US)

( * ) Notice: Subject to any disclaimer, the term of this patent is extended or adjusted under 35 U.S.C. 154(b) by 0 days.

(21) Appl. No.: 19/174,185

(22) Filed: Apr. 9, 2025

(51) Int. Cl.
| | |
|---|---|
| *G06V 20/00* | (2022.01) |
| *G06F 40/166* | (2020.01) |
| *G06F 40/295* | (2020.01) |
| *G06F 40/30* | (2020.01) |
| *G06F 40/40* | (2020.01) |

(Continued)

(52) U.S. Cl.
CPC ............ *G06V 20/47* (2022.01); *G06F 40/166* (2020.01); *G06F 40/295* (2020.01); *G06F 40/30* (2020.01); *G06F 40/40* (2020.01); *G06V 30/10* (2022.01)

(58) Field of Classification Search
CPC ...... G06V 20/47; G06V 30/10; G06F 40/166; G06F 40/295; G06F 40/30; G06F 40/40
See application file for complete search history.

(56) References Cited

U.S. PATENT DOCUMENTS

| | | | |
|---|---|---|---|
| 9,971,755 B2 * | 5/2018 | Chi .................... | G06F 16/972 |
| 11,200,269 B2 * | 12/2021 | Ke ....................... | G06N 5/022 |
| 2008/0027979 A1 * | 1/2008 | Chandrasekar ..... | G06F 16/3334 |

(Continued)

FOREIGN PATENT DOCUMENTS

| | | | | |
|---|---|---|---|---|
| CN | 113343708 A | * | 9/2021 | ............ G06F 18/22 |
| CN | 116304013 A | * | 6/2023 | ............ G06F 16/35 |

(Continued)

OTHER PUBLICATIONS

Adishesha, Amogh Subbakrishna, et al., "Forecasting User Interests Through Topic Tag Predictions in Online Health Communities", ARXIV ID: 2211.02789, Publication Date: Nov. 4, 2022, pp. 3645-3656 (Year: 2022).*

(Continued)

*Primary Examiner* — Laurie A Ries
(74) *Attorney, Agent, or Firm* — Seed Intellectual Property Law Group LLP

(57) ABSTRACT

A facility for connecting devices is described. The facility recurringly captures information presented by the distinguished device, each time generating a summary. The facility determines a short-term interest profile for the distinguished device based on summaries generated for information captured a first trailing window, and determines a long-term interest profile for the distinguished device based on summaries generated for a longer second trailing window. For one or more devices other than the distinguished device, the facility: (1) determines a short-term similarity measure between the distinguished device's short-term interest profile and one determined for the other subject device; (2) determines a long-term similarity measure between the distinguished device's long-term interest profile and one determined for the other subject device; and (3) based on the determined similarity measures, determines whether to match the distinguished device and the other device.

21 Claims, 9 Drawing Sheets

(51) Int. Cl.
*G06V 20/40* (2022.01)
*G06V 30/10* (2022.01)

(56) References Cited

U.S. PATENT DOCUMENTS

| | | | | |
|---|---|---|---|---|
| 2017/0142051 | A1* | 5/2017 | Spivack | H04L 67/535 |
| 2019/0325084 | A1* | 10/2019 | Peng | G06F 16/3322 |
| 2020/0302023 | A1* | 9/2020 | Bouamor | G06N 3/044 |
| 2021/0397636 | A1* | 12/2021 | Margolin | G06F 16/35 |
| 2021/0398539 | A1* | 12/2021 | Wexler | G06F 16/5846 |
| 2022/0300711 | A1* | 9/2022 | Elisco | G06F 16/93 |
| 2022/0414329 | A1* | 12/2022 | Bulu | G06F 40/279 |
| 2025/0173415 | A1* | 5/2025 | Maizels | G06V 40/176 |

FOREIGN PATENT DOCUMENTS

| | | | | |
|---|---|---|---|---|
| CN | 118072712 A * | 5/2024 | | G10L 25/75 |
| WO | WO-2021032824 A1 * | 2/2021 | | G06F 16/3347 |

OTHER PUBLICATIONS

De Campos, Luis M, et al., "LDA-based Term Profiles for Expert Finding in a Political Setting", ARXIV ID: 2401.10617, Publication Date: Jan. 19, 2024, pp. 1-29 (Year: 2024).*

Han, Lei, et al., "A Data-Driven Analysis of Behaviors in Data Curation Processes", Jul. 2023, Association for Computing Machinery, https://dl.acm.org/doi/10.1145/3567419, pp. 1-35. (Year: 2023).*

* cited by examiner

CONNECTING COMPUTING DEVICES PRESENTING INFORMATION RELATING TO THE SAME OR SIMILAR TOPICS

BACKGROUND

Smartphones and other computing devices can be used to access and present information from a variety of sources. Examples include web pages, email messages, text messages, social media feeds, online publications, video and music collections, and games. Information can be accessed and presented by a computing device in a variety of modes, including visual text, audio that can include human or synthesized speech, still images, video or animation sequences, etc.

DETAILED DESCRIPTION

Figure 1:
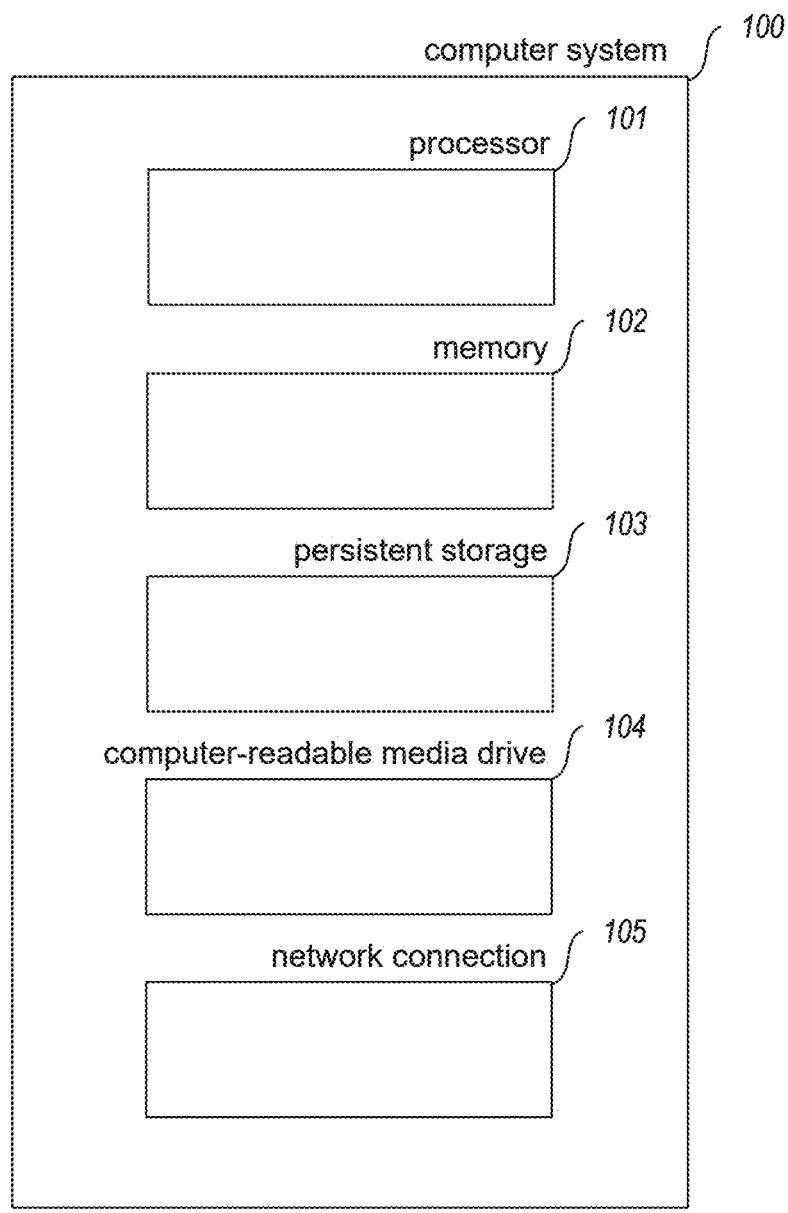
FIG. 1 is a block diagram showing some of the components typically incorporated in at least some of the computer systems and other devices on which the facility operates.

The inventor has recognized that it can be helpful to identify groups of two or more mobile phones or computing devices of other types that are used to access and present information relating to the same or similar topics, and perform a connection action among the computing devices of each group.

In response, the inventor has conceived and reduced to practice a software and/or hardware facility for connecting computing devices presenting information relating to the same or similar topics ("the facility").

In various embodiments, the facility matches a group of two or more computing devices enrolled in or otherwise interacting with the facility ("subject devices") for connection based on a short-term interest profile of each subject device, a long-term interest profile of each subject device, or both. In some embodiments, the facility constructs each of these interest profiles to contain a small group of words, which it compares between subject devices using a tool for assessing semantic similarity.

As a basis for constructing the short- and long-term interest profile of each subject device, the facility observes the information presented by the subject device. In some embodiments, the facility periodically performs a capture process on each subject device as follows, at each expiration of a relatively brief observation capture period, such as 30 seconds. The facility captures audio rendered by the device, as well as visual information presented by the device, such as one or more frames of a video sequence presented by the device, or text or other still visual content presented by the device. The facility automatically transcribes the captured audio to produce a textual transcript of speech (including diverse forms of speech such as singing, whispering, screaming, etc.) that occurs in the audio. The facility generates automatic descriptions of these textual transcripts, as well as the captured visual information, such as by using one or more large language models and/or multimodal models. The facility stores these automatic descriptions in a time-stamped capture observation for the subject device.

The facility periodically constructs short- and long-term interest profiles for each subject device and compares them at each expiration of a longer comparison period, such as 5 minutes. In some embodiments, the facility populates each subject device's short-term interest profile with named entities that it extracts from the subject device's recent capture observations, such as those timestamped in the past 15 minutes. In some embodiments, the facility populates each subject device's long-term interest profile with a group of words whose semantic vectors are nearest to an average of the semantic vectors of the named entities extracted from the subject device's capture observations over a longer period, such as days, weeks, or months. In some embodiments, the facility populates each subject device's long-term interest profile by selecting the words most frequently used by a large language model to characterize topics appearing in the subject device's capture observations over a longer period of time.

In various embodiments, the facility limits the subject devices that are eligible to match based on a variety of factors. These can include, for example: presently being in the same geographic region, or within a threshold distance; having both been in the same geographic region, or within a threshold distance during a recent period of time; satisfying matching preferences established for other subject devices, including an age, sex, gender, relationship status or style, or other attributes of users of these subject devices.

In various embodiments, the facility matches a particular subject device to another subject device based upon two or more words in the particular subject device's short- and/or long-term profile that resulted from different capture modes, e.g., auditory and visual; captures from different applications, e.g., YouTube and Instagram; captures from different categories of applications, e.g., TikTok and Gmail; captures of data on different days; captures of data that originated from different content servers; captures of data that originated from different content publishers; and/or captures of data being exchanged with different devices; etc.

By performing in some or all of the ways described above, the facility matches and connects devices that present information relating to the same or similar topics.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, the facility conserves processing and communication resources that would be needed to match devices via manually-directed efforts by users of the devices.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. For example, the facility's use of large language models, multimodal models, and semantic comparison tools cannot be practically performed in the mind of a person, in view of the significant processing and organizational resources needed to execute and apply these software tools.

FIG. 1 is a block diagram showing some of the components typically incorporated in at least some of the computer systems and other devices on which the facility operates.

In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102—such as RAM, SDRAM, ROM, PROM, etc.—for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 1 and discussed above constitutes a data signal per se. While computer systems configured as described above are typically used to support the operation of the facility, those skilled in the art will appreciate that the facility may be implemented using devices of various types and configurations, and having various components.

Figure 2:
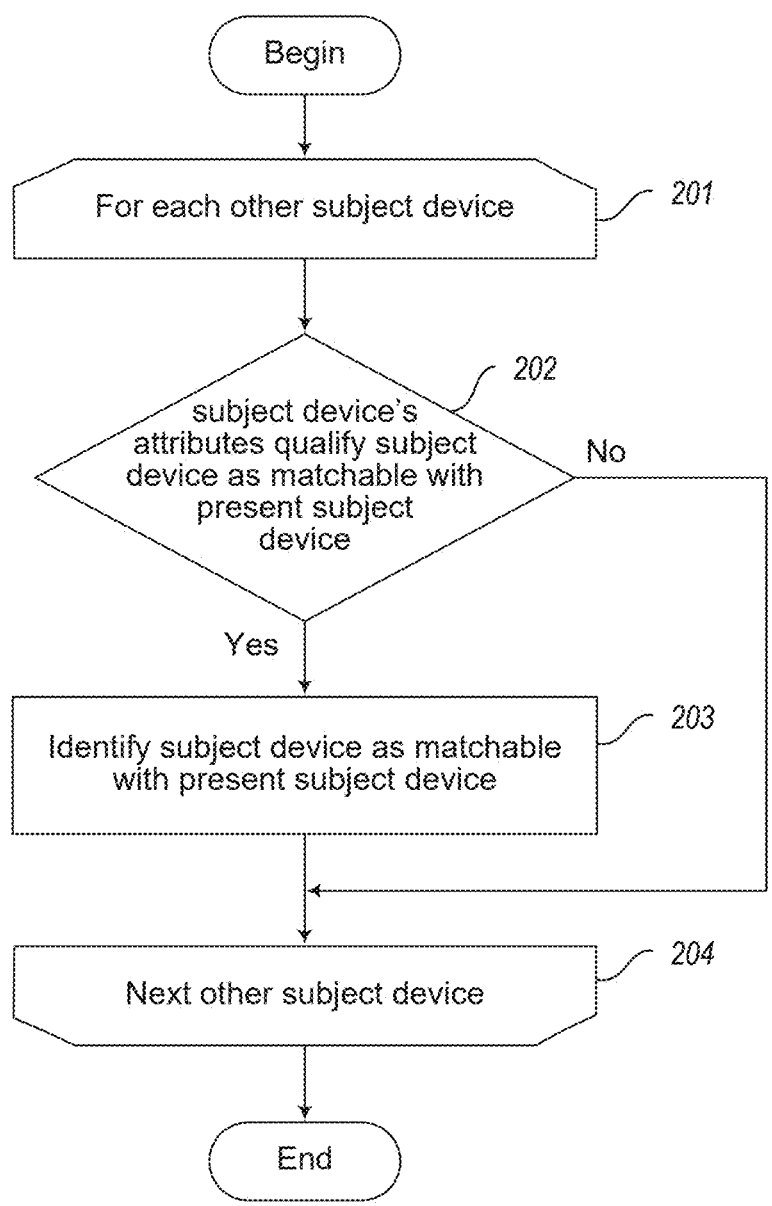
FIG. 2 is a flow diagram showing a process performed by the facility in some embodiment to identify, for a present subject device, which other subject devices are matchable based upon presenting information relating to the same or similar topics.

FIG. 2 is a flow diagram showing a process performed by the facility in some embodiment to identify, for a present subject device, which other subject devices are matchable based upon presenting information relating to the same or similar topics. In acts 201-204, the facility loops through each other subject device. In act 202, if the subject device has attributes that qualify it as matchable with the present subject device, then the facility continues in act 203, else the facility continues in act 204. In some embodiments, the test applied in act 202 has to do with the present or past geographic location of the subject device, such as a geographic location that is presently in the same geographic region as the present subject device or within a threshold distance of it. In some embodiments, the test performed by the facility in step 202 includes satisfaction by attributes of the subject device or its user with preferences about those attributes established for the present subject device, or vice versa; these can include attributes such as the user's age, sex, gender, relationship status or style, preferred activities, etc.

In act 203, the facility identifies the subject device as matchable with the present subject device. In act 204, if additional other subject devices remain to be processed, then the facility continues in act 201 to process the next other subject device, else this process concludes.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
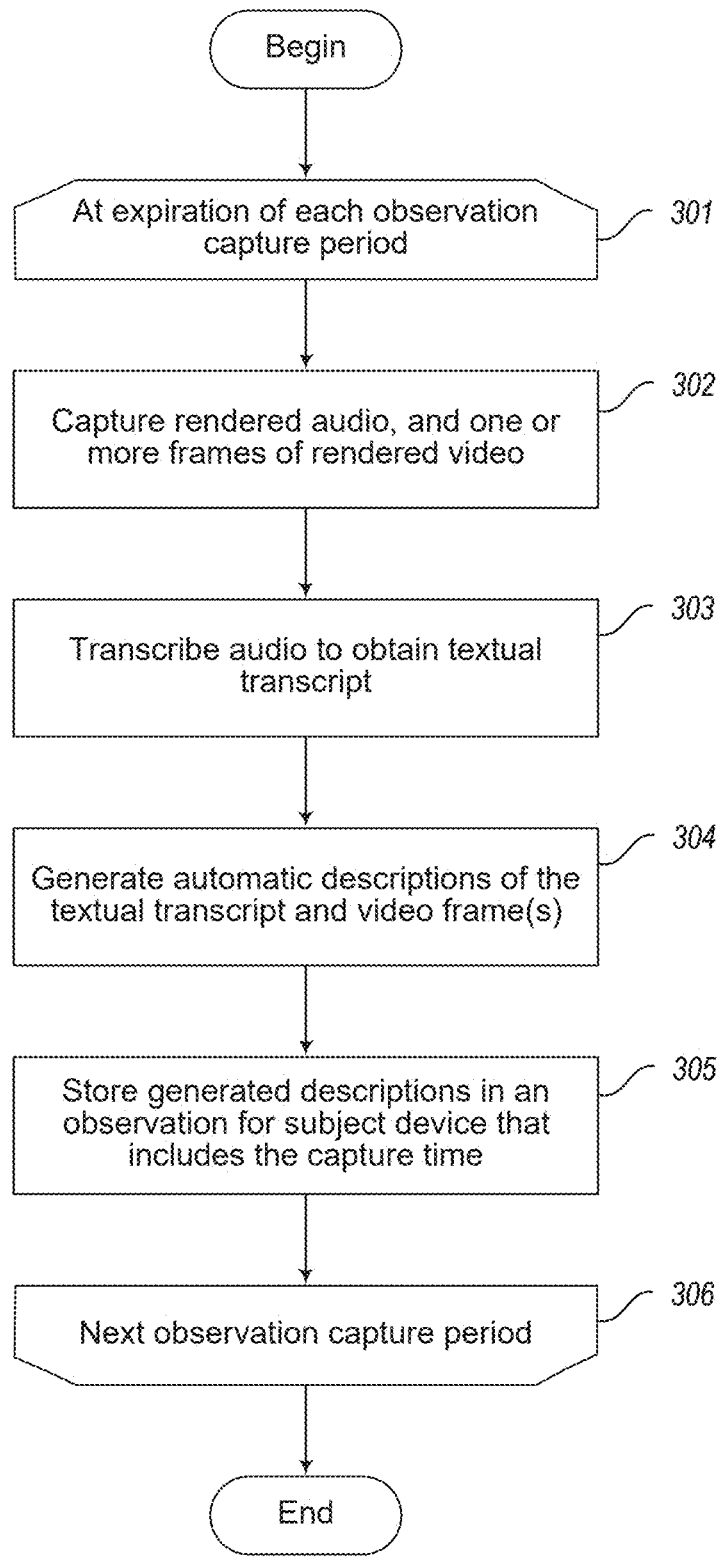
FIG. 3 is a flow diagram showing a process performed by the facility for capturing information presented on a subject device.

FIG. 3 is a flow diagram showing a process performed by the facility for capturing information presented on a subject device. In acts 301-306, the facility loops through each observation capture period, such as observation capture periods that are 30 seconds long. In various embodiments, the facility uses observation capture periods of a variety of lengths, such as 1 second, 5 seconds, 10 seconds, 15 seconds, 20 seconds, 40 seconds, 60 seconds, 90 seconds, 120 seconds, 5 minutes, etc.

In act 302, the facility captures audio presently being rendered on the device, and one or more frames of video being rendered by the device, text displayed by the device, static images being displayed by the device, etc. In some embodiments, the facility installs and executes on the device two packages: a first that captures screenshots-such as react-native-view-shot, described at www.npmjs.com/package/react-native-view-shot?activeTab=explore—and a second that captures audio, such as react-native-audio-recorder-player, described at www.npmjs.com/package/react-native-audio-recorder player; these packages record audio and visual outputs locally to the device, and the facility sends short-term summaries to a cloud-based backend. In some embodiments, the facility captures data on the device using the iOS ReplayKit, described at developer.apple.com/documentation/replaykit. The facility initiates a continuous livestream from the device to a cloud-based server to relay this recorded data.

In act 303, the facility transcribes the audio captured in act 302 to obtain a textual transcript. In various embodiments, the facility uses a variety of tools to perform the transcription of act 303, including a voice-to-speech library function, a multi-modal language model, etc. In some embodiments, the facility performs the transcription using an audio transcription Transcriptions API exposed by openAI described at platform.openai.com/docs/guides/speech-to-text.

In act 304, the facility generates automatic descriptions of the textual transcript generated in act 303 and the video frames and/or other visual information captured in act 302. In various embodiments, the facility uses a variety of tools to generate these automatic descriptions, including, for example, large language models, multi-modal language models, procedural natural language processing and summarization tools, etc. In some embodiments, to generate an automatic description of the video, the facility submits the video to a Completions API exposed by openAI described at platform.openai.com/docs/api-reference/completions, with the prompt shown below in Table 1.

TABLE 1

Describe what is shown in this screenshot of a phone screen. Please also include the full name of the app or website being used, if possible. Be concise and direct.

In some embodiments, the facility generates a description of the audio transcript by submitting it to an LLM with the prompt shown below in Table 2, in which the audio transcript is substituted for the string "{transcript}", and the result of the video prompt is inserted in place of the string "{result}".

TABLE 2

System prompt: You are an assistant that interprets audio transcripts. User prompt: Here is a transcript of an audio clip. Please describe what is happening given the following video description: {result}. Audio transcript: {transcript}. Do not mention the video description in your response.

In some embodiments (not shown), a multimodal model produces a summary directly from the captured audio, omitting the transcription step.

In act 305, the facility stores the descriptions generated in act 304 in an observation that identifies the subject device and the time and date at which the capture was performed. In act 306, at the expiration of the next observation capture period, the facility continues in act 301.

Figure 4:
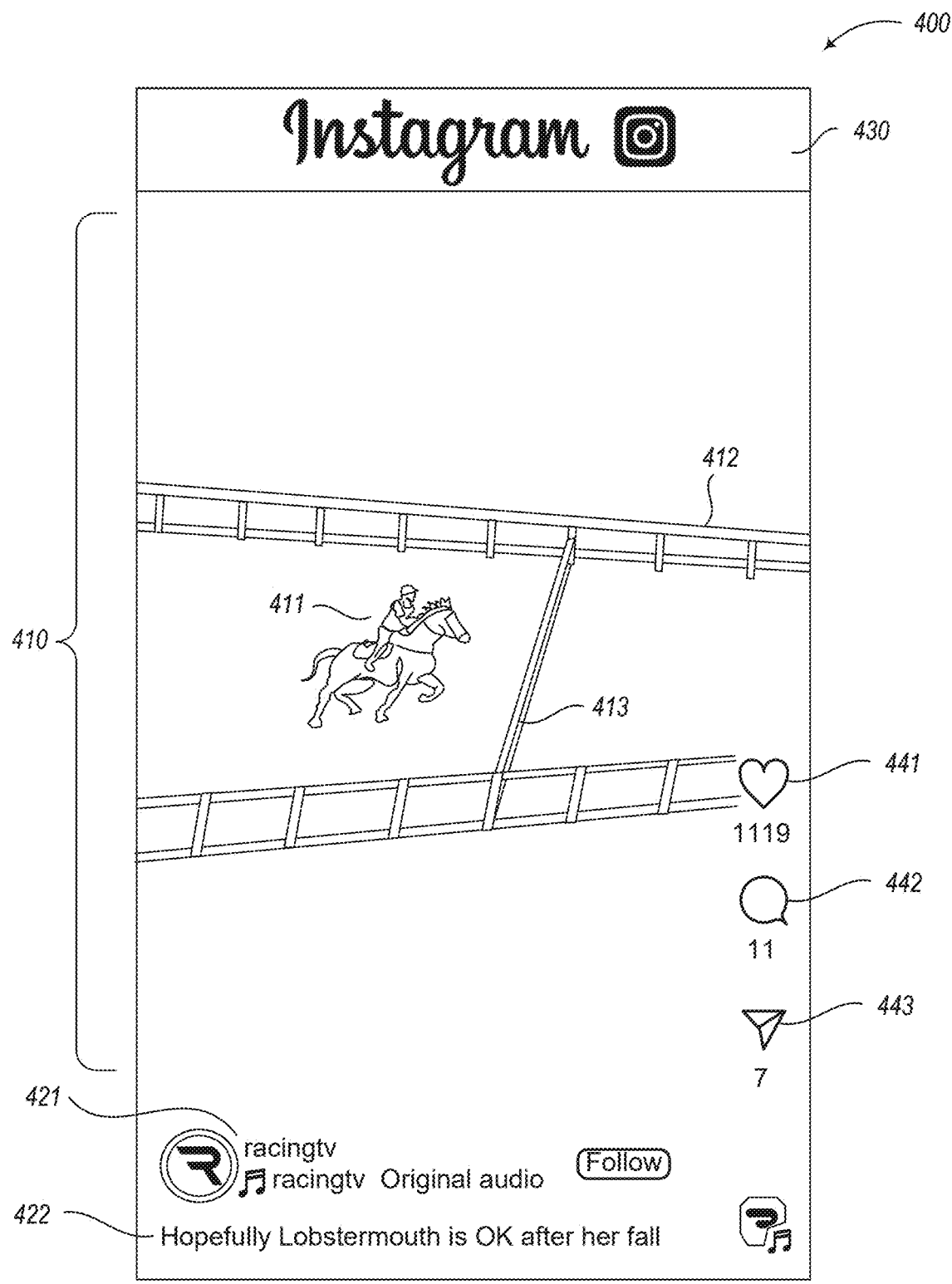
FIG. 4 is a display diagram showing a sample display presented on a subject device for capture by the facility.

FIG. 4 is a display diagram showing a sample display presented on a subject device for capture by the facility. The display 400 is generated on the device by execution of an Instagram app 430. It includes a video 410 of a race horse and jockey 411 running on a race track 412 having a hurdle 413 to be jumped. The display further has visual information 421 identifying a channel in which the horse racing video is published, and a textual message 422 about the video. The display also includes icons and counters for likes 441, comments 442, and shares 443 received by the video from various users. In some embodiments, the facility captures this single image in an observation capture; in some embodiments, it captures a series of frames including this one, and/or corresponding audio.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

In performing an observation capture from the subject device shown in FIG. 4, the facility generates the description of the textual transcript of the captured audio shown below in Table 3.

TABLE 3 person speaking in audio seems to be commenting on a particular event or action taking place in given context, likely pertaining to horse racing video displayed on racing tv app. they might be referring to how a horse, potentially Lossiemouth (the mentioned in caption), has to jump over a TABLE 3-continued hurdle, saying they 'just have to pop it', possibly indicating a smooth leap over an obstacle in a race.

The facility further generates the description of the captured video shown below in Table 4.

TABLE 4

App is Instagram, displaying "racing tv", featuring a video of a horse jumping over a hurdle. below video, there are interaction icons, including likes (1,119), comments (11), and shares (7). caption mentions concern for a horse named Lossiemouth.

Figure 5:
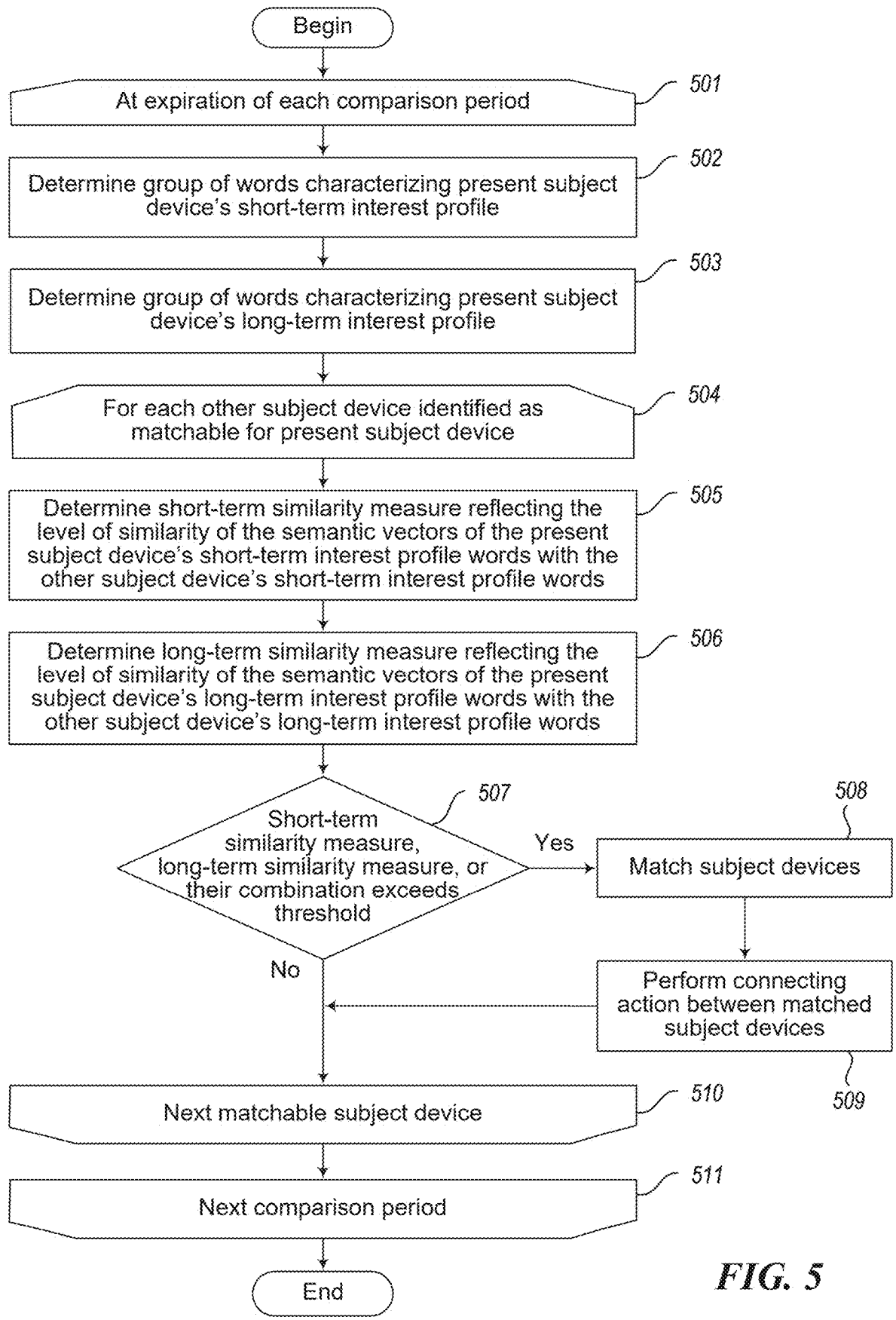
FIG. 5 is a flow diagram showing a process performed by the facility to compare a present subject device to other subject devices for matching.
Figure 6:
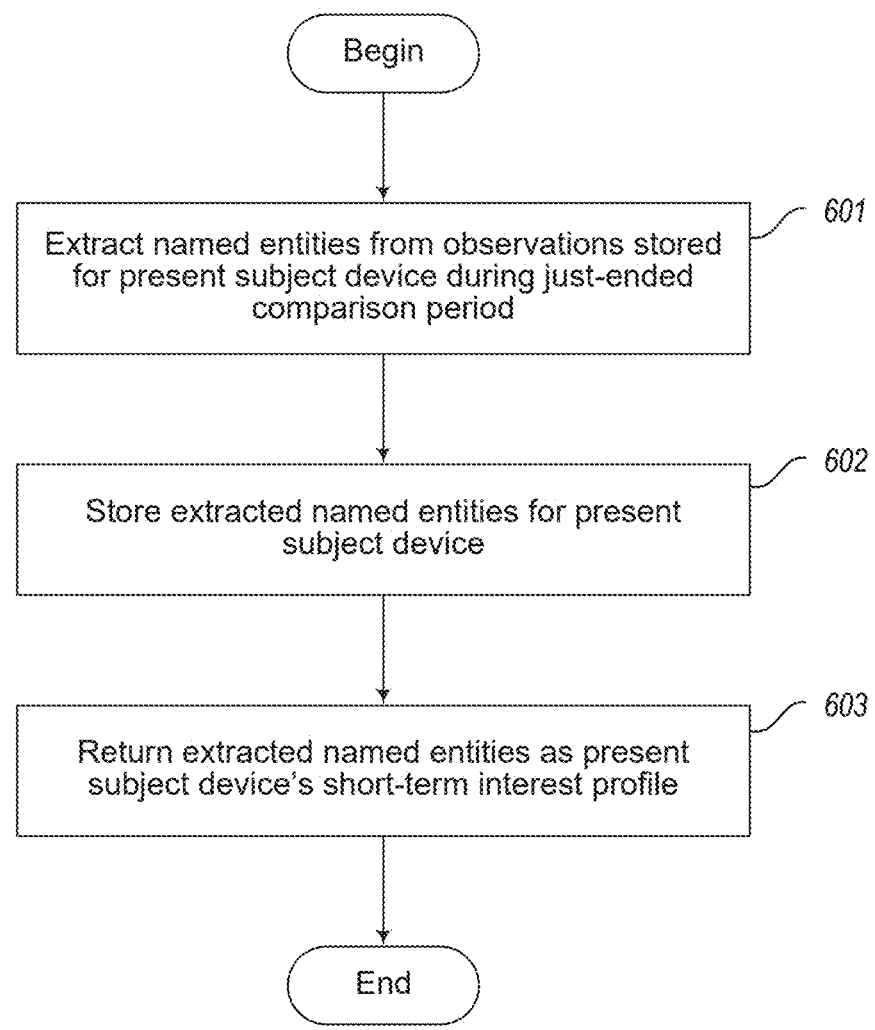
FIG. 6 is a flow diagram showing a process performed by the facility in some embodiments to construct a short-term interest profile for a subject device.

FIG. 5 is a flow diagram showing a process performed by the facility to compare a present subject device to other subject devices for matching. In acts 501-511, the facility loops through each comparison period. In some embodiments, comparison periods last longer than observation capture periods, such as every 2 minutes, 3 minutes, 5 minutes, 7 minutes, 10 minutes, 15 minutes, 20 minutes, etc. In act 502, the facility determines a group of words that characterize the present subject device's short-term interest profile. FIG. 6 described below shows the process used by the facility in act 502 in some embodiments.

FIG. 6 is a flow diagram showing a process performed by the facility in some embodiments to construct a short-term interest profile for a subject device. In act 601, the facility extracts named entities from observations stored for the present subject device during the just-ended comparison period, and optionally one or more immediately-preceding comparison periods. In some embodiments, to extract named entities in act 601, the facility uses a en_core_web_lg spaCy model described at spacy.io/models/en #en_core_web_lg and spacy.io/usage/linguistic-features #named-entitites. In some embodiments, the facility customizes this model to better identify named entities relating to topics of interest, using the spaCy training functionality described at spacy.io/usage/training.

In act 602, the facility stores the named entities extracted in act 601 for the present subject device. In act 603, the facility returns the extracted named entities as the present subject device's short-term interest profile. After act 603, this process concludes.

In some embodiments, in act 603, the facility returns a short-term interest profile based on the capture shown in FIG. 4 made up of the words or phrases shown in Table 5 below.

TABLE 5

Horse racing
Horse
Lossiemouth
Hurdle
Pop
Leap
Obstacle
Race
Instagram
Horse
Jumping
Hurdle
Horse
Lossiemouth In some embodiments, instead of extracting named entities from the present subject device's observations, or when an attempt to do so fails or produces inadequate results, the facility extracts all nouns from these observations and filters them by removing words that are on a list of stopwords not expected to be useful in identifying topics occurring in presented information.

Figure 7A:
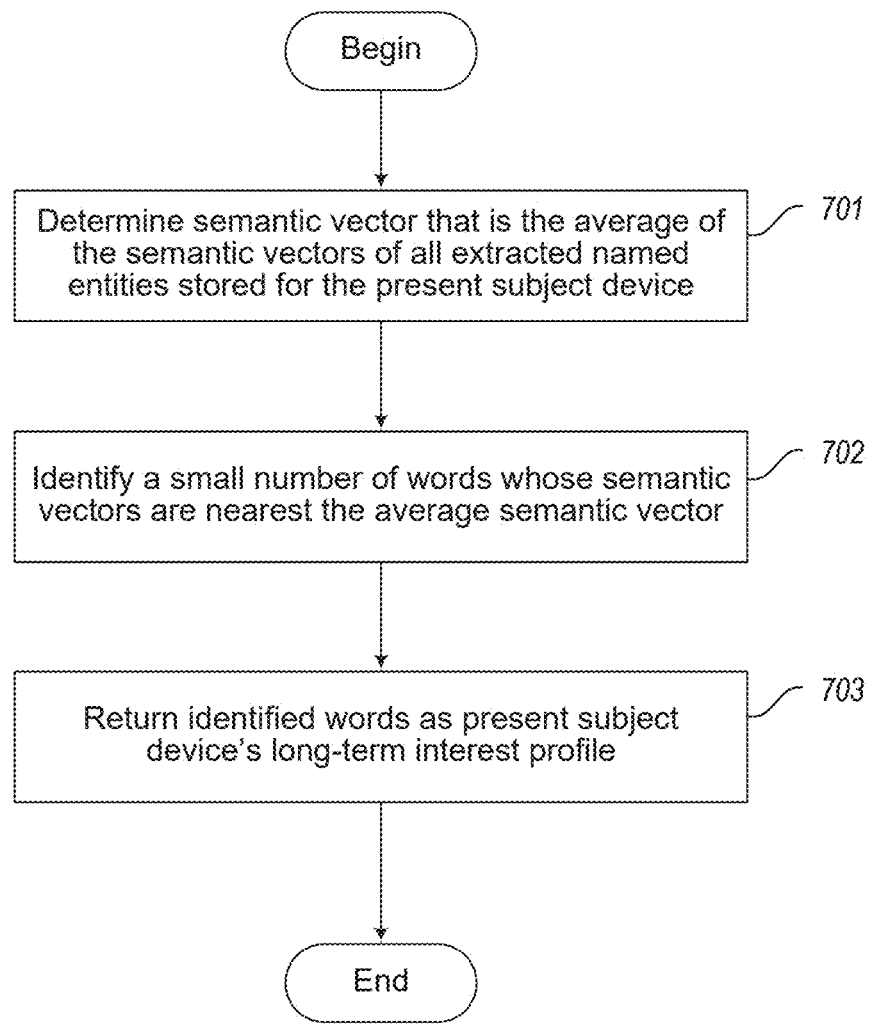
FIG. 7A is a flow diagram showing a first alternative process used by the facility to construct a long-term interest profile for a subject device.
Figure 7B:
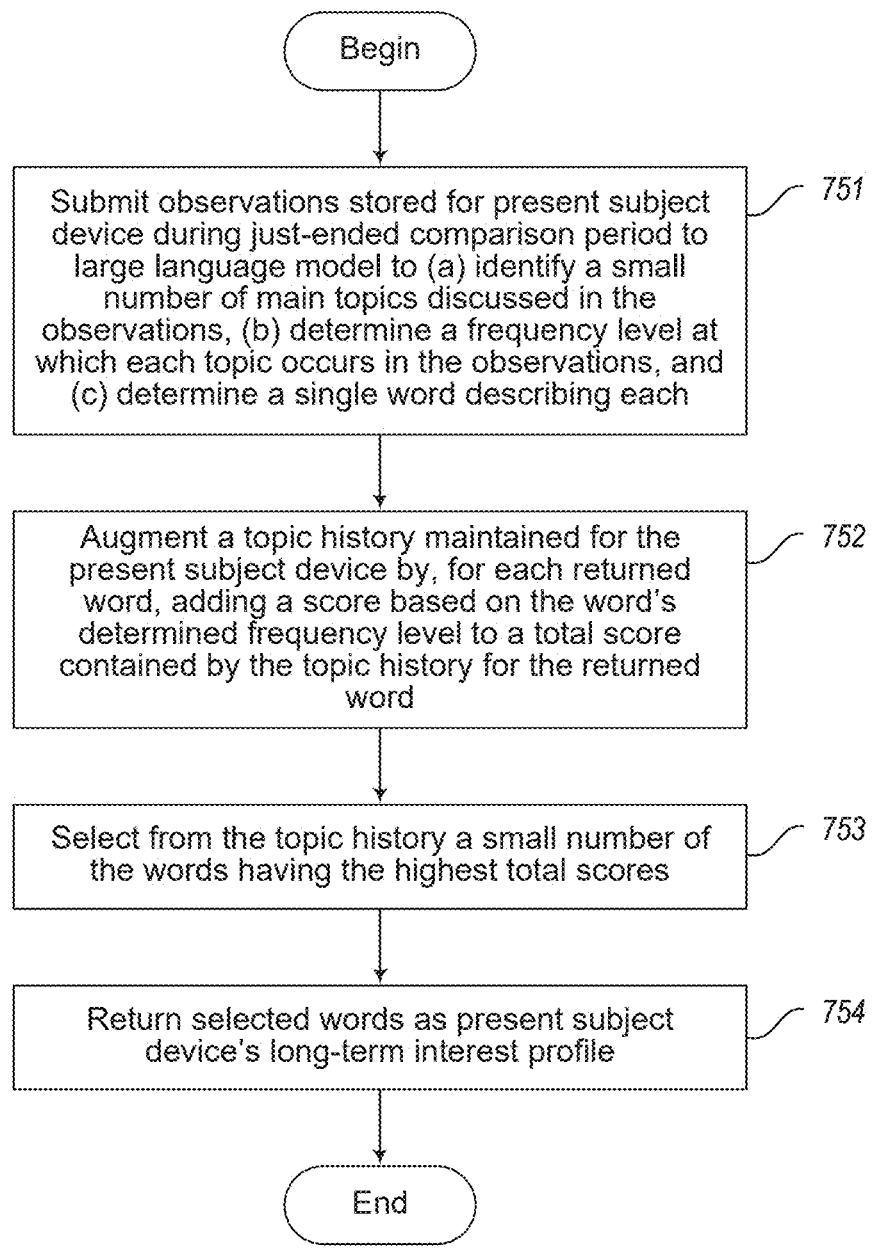
FIG. 7B is a flow diagram showing a second alternative process used by the facility to construct a long-term interest profile for a subject device.

Returning to FIG. 5, in act 503, the facility determines a group of words that characterize the present subject device's long-term interest profile. FIGS. 7A and 7B show alternative processes performed by the facility in act 503 in various embodiments to construct a subject device's long-term interest profile.

FIG. 7A is a flow diagram showing a first alternative process used by the facility to construct a long-term interest profile for a subject device. In act 701, the facility determines a semantic vector that is the average of the semantic vectors of the all extracted named entities stored for the present subject device. In act 702, the facility identifies a small number of words whose semantic vectors are nearest the average semantic vector determined in act 701. In some embodiments, in act 702, the facility alternatively identifies a small number of words whose semantic vectors average to a second average semantic vector approximately equal to the average semantic vector determined in act 701, despite not necessarily being the words whose semantic vectors are individually nearest to the average determined in act 701. In some embodiments, the facility performs the identification of act 702 using an ongoing evolving topic history that it augments and selects from as described below in connection with acts 752 and 753 shown in FIG. 7B. In some embodiments, the facility's augmentation of this topic history uses scores that are adjusted in a way that is inversely related to the distance between each of the semantic vector for each topic and the average semantic vector. In act 703, the facility returns the words identified in act 702 as the present subject device's long-term interest profile. After act 703, this process concludes.

In some embodiments, in act 703, the facility returns the words shown below in Table 6 as the long-term interest profile of the present subject device.

TABLE 6

| |
|---|
| Horse |
| Race |
| Jump |

FIG. 7B is a flow diagram showing a second alternative process used by the facility to construct a long-term interest profile for a subject device. In act 751, the facility submits to a large language model observations stored for the present subject device during the just-ended comparison period, and optionally one or more immediately preceding comparison periods. The submission includes a prompt instructing the large language model to (a) identify a small number of main topics discussed in the observations, (b) determine a frequency level at which each topic occurs in the observations, and (c) determine a single word describing each. In some embodiments, the facility makes the submission to the GPT-4 large language model, with the prompt shown below in Table 7. In some embodiments, the facility submits this prompt with the parameter value temperature=0.1 to induce predictable responses.

TABLE 7

Please output ONLY A FEW (3-5) words that describe the main topics described in this document. For each word, also indicate whether the topic's frequency in the text is HIGH, MEDIUM, or LOW. Output TABLE 7-continued nothing but the words and the frequencies, comma separated with colons between the words and the frequencies, like this: WORD1: LOW, WORD2: MEDIUM. Do not use semicolons. Only give the main topics and activities, no abstract concepts. The less words the better.

In act 752, the facility augments a topic history maintained for the present subject device: for each word returned by the LLM in act 751, the facility adds a score based on the frequency level determined by the LLM for the word to a total score contained by the topic history for the word. In act 753, the facility selects from the topic history for the present subject device as augmented in act 752 a small number of the words now having the highest total scores. In act 754, the facility returns the words selected in act 753 as the long-term interest profile for the present subject device. After act 754, this process concludes.

Returning to FIG. 5, in acts 504-510, the facility loops each other subject device that has been identified as matchable for the present subject device, such as by using the process shown in FIG. 2. In act 505, the facility determines a short-term similarity measure that reflects the level of similarity of the semantic vectors for the present subject device's short-term interest profile words determined in act 502 with the short-term interest profile words of the other subject device.

In some embodiments, in act 504, the facility determines a short-term similarity measure between the present subject device having the short-term interest profile shown above in Table 5 and a short-term interest profile for a second subject device shown below in Table 8.

TABLE 8

| |
|---|
| Horse racing |
| Race track |
| Hurdle |
| Run |
| Tickets |
| Race track |
| Bet |
| Betting |
| Tea |
| Tea Party |
| Beverages |
| Croissants |

In some embodiments, the facility generates the short-term similarity measure using the spaCy tool as described at spacy.io/usage/linguistic-features #vectors-similarity.

In act 506, the facility determines a long-term similarity measure that reflects the level of similarity of the semantic vectors for the present subject device's long-term interest profile words determined in act 502 with the long-term interest profile words of the other subject device.

In some embodiments, the facility determines a long-term similarity measure based upon a long-term interest profile for the second subject device shown below in Table 9.

TABLE 9

| |
|---|
| Bet |
| Horse |
| Tea |

In some embodiments, the facility determines the long-term similarity measure in the same or similar manner as described above in connection with the short-term similarity measure.

In act 507, if the short-term similarity measure determined in act 505, the long-term similarity measure determined in act 506, or their combination exceed a predetermined threshold, then the facility continues in act 508, else the facility continues in act 510. In some embodiments, the facility finds a match where (a) the short-term similarity measure exceeds 0.7; (b) the long-term similarity measure exceeds 0.6; or (c) the short-term similarity exceeds 0.55 and the long-term similarity measure exceeds 0.5. In act 508, the facility matches the two subject devices. In act 509, the facility performs a connecting action between the matched subject devices.

In various embodiments, the facility performs a variety of connecting actions in act 509, including: installing the same app on both subject devices that relates to topics shared between the subject devices' interest profiles; downloading particular content to both subject devices relating to such shared topics; registering both subject devices to be pushed content in the future relating to shared topics; providing a communication mechanism between the subject devices for dating; providing a communication mechanism between the subject devices for platonic friendship; causing the same advertising messages to be presented on both subject devices; optimizing both subject devices to better render content relating to the shared topics. After act 509, the facility continues in act 510. If additional matchable subject devices remain, the facility continues in act 504 to process the next matchable subject device. In act 511, when the next comparison period expires, the facility continues in act 501.

Figure 8:
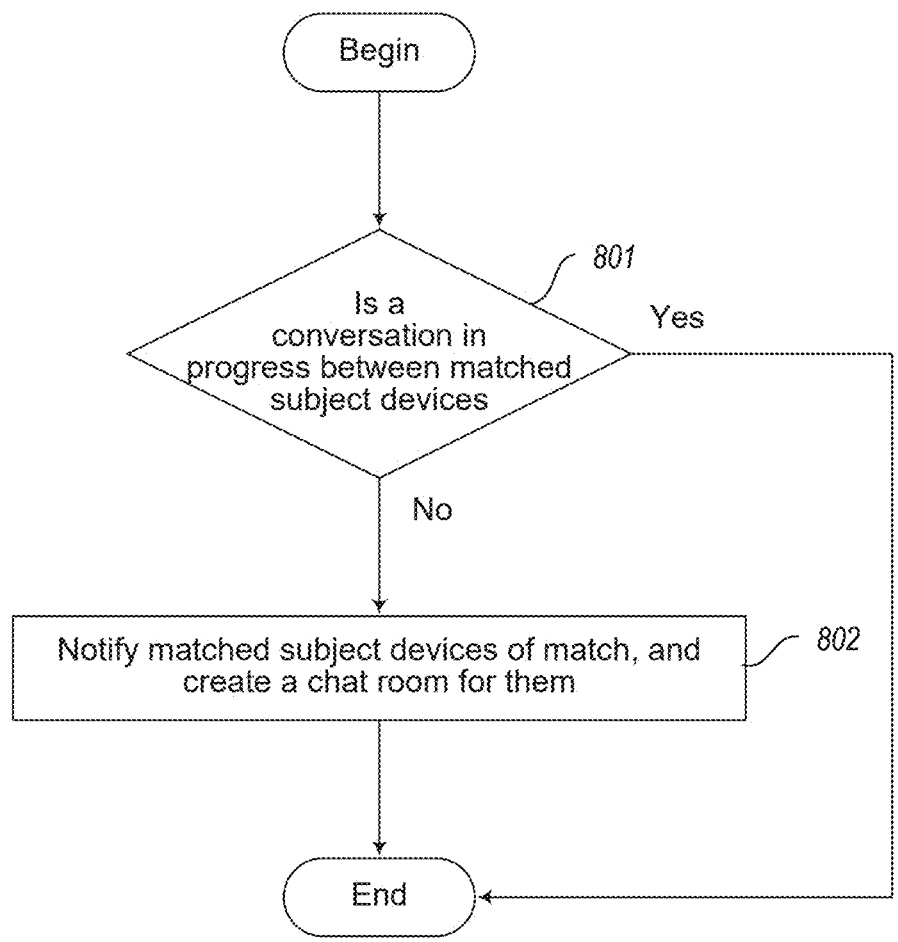
FIG. 8 is a flow diagram showing a process performed by the facility in some embodiments to perform a connection action between a pair of matched subject devices.

FIG. 8 is a flow diagram showing a process performed by the facility in some embodiments to perform a connection action between a pair of matched subject devices. In act 801, if a conversation is already in progress between the matched subject devices, then this process concludes, else the facility continues in act 802. In act 802, the facility notifies the matched subject devices of the match, and creates a chat room in which the matched subject devices can communicate. After act 802, this process concludes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more memories collectively having contents configured to cause a computing system to perform a method, the method comprising:
  for each of a plurality of first times that occur at a first frequency:
    in a distinguished subject device, capturing audio and visual information presented by the distinguished device proximate to the first time;
    automatically generating a summary of the captured audio and visual information;
    storing the generated summary for the distinguished subject device and the first time;
  for each of a plurality of second times that occur at a second frequency lower than the first frequency:
    automatically determining a first set of words constituting a short-term interest profile for the distinguished subject device that is based on summaries stored for the distinguished subject device for first times within a first trailing window of a first length ending at the second time;
    automatically determining a second set of words constituting a long-term interest profile for the distinguished subject device that is based on summaries stored for the distinguished subject device for first times within a second trailing window of a second length ending at the second time, the second length being longer than the first length;
    for each of a plurality of subject devices other than the distinguished subject device:
      (1) accessing a latest short-term interest profile automatically determined for the other subject device;
      (2) determining a short-term similarity measure between the latest short-term interest profile automatically determined for the distinguished subject device and the latest short-term interest profile automatically determined for the other subject device;
      (3) accessing a latest long-term interest profile automatically determined for the other subject device;
      (4) determining a long-term similarity measure between the latest long-term interest profile automatically determined for the distinguished subject device and the latest long-term interest profile automatically determined for the other subject device;
      (5) based on the determined similarity measures, determining whether to match the distinguished subject device and the other subject device; and
      (6) where it is determined to match the distinguished subject device and the other subject device, performing a connecting action with respect to the distinguished subject device and the other subject device.

2. The one or more memories of claim 1 wherein generating the summary comprises prompting a multimodal model to summarize the captured audio information, the captured video information, or the captured audio information and the captured video information.

3. The one or more memories of claim 1 wherein generating the summary comprises:
  automatically transcribing the captured audio information to obtain a textual transcript; and
  prompting a large language model to summarize the textual transcript.

4. The one or more memories of claim 1 wherein generating the summary comprises:
  applying optical character recognition to the captured visual information to obtain text captured visual information; and
  prompting a large language model to summarize the obtained text.

5. The one or more memories of claim 1 wherein determining the first set of words constituting the short-term interest profile for the distinguished subject device comprises (1) extracting first named entities from summaries stored for the distinguished subject device for first times within the first trailing window, and (2) establishing the first set of words at least in part based on the extracted first named entities, and/or wherein determining the second set of words constituting the long-term interest profile for the distinguished subject device comprises (1) extracting second named entities from summaries stored for the distinguished subject device for first times within the second trailing window and (2) establishing the second set of words at least in part based on the extracted second named entities.

6. The one or more memories of claim 5, wherein establishing the first set of words comprises:

for each named entity in the first set of named entities, accessing a semantic vector characterizing the meaning of the named entity;
determining an average of the accessed semantic vectors;
identifying a third set of words that are each approximately equal to the average; and
establishing the third set of words as the first set of words, and/or wherein establishing the second set of words comprises:

for each named entity in the second set of named entities, accessing a semantic vector characterizing the meaning of the named entity;
determining an average of the accessed semantic vectors;
identifying a fourth set of words that are each approximately equal to the average; and
establishing the fourth set of words as the second set of words.

7. The one or more memories of claim 5, wherein establishing the first set of words comprises:

for each named entity in the first set of named entities, accessing a semantic vector characterizing the meaning of the named entity;
determining an average of the accessed semantic vectors;
identifying a third set of words such that the average of semantic vectors characterizing the meanings of the words of the third set is approximately equal to the average; and
establishing the third set of words as the first set of words, and/or wherein establishing the second set of words comprises:

for each named entity in the second set of named entities, accessing a semantic vector characterizing the meaning of the named entity;
determining an average of the accessed semantic vectors;
identifying a fourth set of words such that the average of semantic vectors characterizing the meanings of the words of the fourth set is approximately equal to the average; and
establishing the fourth set of words as the second set of words.

8. The one or more memories of claim 1 wherein determining the first set of words constituting the short-term interest profile for the distinguished subject device comprises:

extracting a third set of words from summaries stored for the distinguished subject device for first times within the first trailing window, each of the third set of words being a noun; and
filtering the third set of words to remove stopwords in a fourth set of words, to obtain the first set of words, and/or wherein determining the second set of words constituting the long interest profile for the distinguished subject device comprises:

extracting a fifth set of words from summaries stored for the distinguished subject device for first times within the second trailing window, each of the fifth set of words being a noun; and
filtering the fifth set of words to remove stopwords in the fourth set of words, to obtain the second set of words.

9. The one or more memories of claim 1 wherein determining the first set of words constituting the short-term interest profile for the distinguished subject device comprises submitting the summaries stored for the distinguished subject device for first times within a first trailing window to a large language model with a prompt directing the large language model to discern primary topics within the submitted summaries and select a word representing each, and/or wherein determining the second set of words constituting the long interest profile for the distinguished subject device comprises submitting the summaries stored for the distinguished subject device for first times within a third trailing window to a large language model with a prompt directing the large language model to discern primary topics within the submitted summaries and select a word representing each.

10. The one or more memories of claim 9, the method further comprising:

tracking a frequency of words representing topics returned by the large language model; and
selecting as the second set of words the words returned by the large language model having the highest frequency.

11. The one or more memories of claim 1, the method further comprising:

for each of a multiplicity of other subject devices that is a proper superset of the plurality of other subject devices, determining whether the other subject device is matchable with the distinguished subject device, based upon factors comprising any of the following:
presently being in the same geographic region,
presently within a threshold distance,
having both been in the same geographic region during a recent period of time,
having both been within a threshold distance during a recent period of time, and
satisfying matching preferences established for the single subject device with respect to users of other subject devices, including an age, sex, gender, relationship status, and/or relationship style, and wherein the plurality of other subject devices for which acts (1)-(6) are performed include only other subject devices determined to be matchable with the distinguished subject device.

12. The one or more memories of claim 1 wherein the connection action comprises any of:

causing a distinguished app to be installed on both the distinguished subject device and the matching other subject device;
causing distinguished content to be downloaded to both the distinguished subject device and the matching other subject device;
registering both the distinguished subject device and the matching other subject device to receive distinguished content in the future; and
establishing a communication mechanism between the distinguished subject device and the matching other subject device.

13. A method in a computing system, comprising:
in a distinguished subject device, recurringly capturing a body of information presented by the distinguished device;
automatically generating summaries of the captured bodies of information;
automatically determining a short-term interest profile for the distinguished subject device that is based on summaries of information captured in the distinguished subject device at times within a first trailing window of a first length;
automatically determining a long-term interest profile for the distinguished subject device that is based on summaries of information captured in the distinguished subject device at times within a second trailing window of a second length, the second length being longer than the first length;
for each of a plurality of subject devices other than the distinguished subject device:
  accessing a short-term interest profile automatically determined for the other subject device;
  determining a short-term similarity measure between the short-term interest profile automatically determined for the distinguished subject device and the short-term interest profile automatically determined for the other subject device;
  accessing a long-term interest profile automatically determined for the other subject device;
  determining a long-term similarity measure between the long-term interest profile automatically determined for the distinguished subject device and the long-term interest profile automatically determined for the other subject device; and
  based on the determined similarity measures, determining whether to match the distinguished subject device and the other subject device.

14. The method of claim 13, further comprising:
where it is determined to match the distinguished subject device and the other subject device, performing a connecting action with respect to the distinguished subject device and the other subject device.

15. The method of claim 13 wherein the captured information comprises captured information comprises visual information.

16. The method of claim 13 wherein the captured information comprises captured information comprises audio information.

17. A method in a computing system, comprising:
in a distinguished subject device, recurringly capturing a body of information presented by the distinguished device;
automatically generating textual summaries of the captured bodies of information;
automatically determining an interest profile comprising a set of word vectors that is based on the generated summaries;
for each of a plurality of subject devices other than the distinguished subject device:
  accessing an interest profile automatically determined for the other subject device;
  determining a similarity measure between the interest profile automatically determined for the distinguished subject device and the interest profile automatically determined for the other subject device; and
  based on the determined similarity measure, determining whether to match the distinguished subject device and the other subject device.

18. A computing system, comprising:
one or more processors; and
one or more memories collectively having contents configured to cause the one or more processors to perform a method, the method comprising:
  for each of a plurality of first times that occur at a first frequency:
    in a distinguished subject device, capturing information presented by the distinguished device proximate to the first time;
    automatically generating a summary of the captured information;
    storing the generated summary for the distinguished subject device and the first time;
  for each of a plurality of second times that occur at a second frequency lower than the first frequency:
    automatically determining a short-term interest profile for the distinguished subject device that is based on summaries stored for the distinguished subject device for first times within a first trailing window of a first length ending at the second time;
    automatically determining a long-term interest profile for the distinguished subject device that is based on summaries stored for the distinguished subject device for first times within a second trailing window of a second length ending at the second time, the second length being longer than the first length;
    for each of a plurality of subject devices other than the distinguished subject device:
      accessing a latest short-term interest profile automatically determined for the other subject device;
      determining a short-term similarity measure between the latest short-term interest profile automatically determined for the distinguished subject device and the latest short-term interest profile automatically determined for the other subject device;
      accessing a latest long-term interest profile automatically determined for the other subject device;
      determining a long-term similarity measure between the latest long-term interest profile automatically determined for the distinguished subject device and the latest long-term interest profile automatically determined for the other subject device; and
      based on the determined similarity measures, determining whether to match the distinguished subject device and the other subject device.

19. The computing system of claim 18, the method further comprising:
where it is determined to match the distinguished subject device and the other subject device, performing a connecting action with respect to the distinguished subject device and the other subject device.

20. The computing system of claim 18 wherein the captured information comprises visual information.

21. The computing system of claim 18 wherein the captured information comprises audio information.

* * * * *